US009440428B2

(12) United States Patent
Carroll

(10) Patent No.: US 9,440,428 B2
(45) Date of Patent: Sep. 13, 2016

(54) CLEAN EDGE BUSINESS CARDS

(71) Applicant: Blanks USA, Brooklyn Park, MN (US)

(72) Inventor: Benjamin Todd Carroll, Brooklyn Park, MN (US)

(73) Assignee: Blanks USA, Brooklyn Park, MN (US)

( * ) Notice: Subject to any disclaimer, the term of this patent is extended or adjusted under 35 U.S.C. 154(b) by 607 days.

(21) Appl. No.: 13/804,515

(22) Filed: Mar. 14, 2013

(65) Prior Publication Data

US 2014/0274640 A1 Sep. 18, 2014

(51) Int. Cl.

| | |
|---|---|
| ***B32B 3/10*** | (2006.01) |
| ***B41F 23/00*** | (2006.01) |
| ***B42D 5/00*** | (2006.01) |
| ***B42D 15/04*** | (2006.01) |
| *B41M 5/00* | (2006.01) |

(52) U.S. Cl.

CPC ............... *B41F 23/00* (2013.01); *B42D 5/002* (2013.01); *B42D 15/045* (2013.01); *B41M 5/00* (2013.01); *Y10T 428/15* (2015.01)

(58) Field of Classification Search

CPC .................... Y10T 428/15; Y10T 428/24314; G09F 2003/0267

USPC ........................................................... 428/43

See application file for complete search history.

(56) References Cited

U.S. PATENT DOCUMENTS

| | | | | |
|---|---|---|---|---|
| 5,198,275 | A | 3/1993 | Klein | |
| 5,853,837 | A | 12/1998 | Popat | |
| 5,993,928 | A | 11/1999 | Popat | |
| 6,179,201 | B1 * | 1/2001 | Chess | B42D 5/025 229/92.1 |
| 7,377,996 | B2 | 5/2008 | Bilodeau | |
| 7,501,170 | B2 | 3/2009 | Utz et al. | |
| 7,514,134 | B2 | 4/2009 | Utz et al. | |
| 7,531,227 | B2 | 5/2009 | Utz et al. | |
| 7,534,479 | B2 | 5/2009 | Utz et al. | |
| 7,549,571 | B2 * | 6/2009 | DeLaVergne | B65D 27/06 229/303 |
| RE41,649 | E | 9/2010 | Popat | |
| RE41,650 | E | 9/2010 | Popat | |
| 8,003,184 | B2 | 8/2011 | Ugolick | |
| RE42,719 | E | 9/2011 | Utz et al. | |
| RE42,798 | E | 10/2011 | Utz et al. | |
| RE43,094 | E | 1/2012 | Utz et al. | |
| RE43,165 | E | 2/2012 | Utz et al. | |
| 2007/0196623 | A1 | 8/2007 | Bilodeau et al. | |

* cited by examiner

*Primary Examiner* — Alexander Thomas

(74) *Attorney, Agent, or Firm* — Kinney & Lange, P.A.

(57) ABSTRACT

A printable blank sheet includes a sheet with defined separation lines, a first layer with cuts running through the first layer along the defined separation lines, and a second layer attached to a bottom side of the first layer, with perforations running through the second layer along the defined separation lines. A method for creating custom print cards includes running a printable blank sheet through a printer to print on defined print areas, wherein the sheet includes slit-over-perforation lines defining a periphery of an object in the sheet, bending the sheet along the slit-over-perforation lines to weaken and separate the slit-over-perforation lines, and detaching the object from the sheet.

19 Claims, 7 Drawing Sheets

CLEAN EDGE BUSINESS CARDS

BACKGROUND

The present invention relates to printable blank sheets that are capable of being run through a printer, and in particular, to a printable blank sheet with objects that have clean edges when the objects are separated from the sheet.

Custom print materials have become a common way for businesses to market themselves. Custom print materials that are typically used in advertising include products like business cards, postcards, flyers, calendars, and door hangers. Typically, custom print materials are sent to print shops that specialize in preparing custom print materials, as the materials have had to be printed and assembled by specialized machines. As a result, having custom print materials made can be costly and time-consuming. Some templates are available that allow a user to make their own custom print materials without having to send their order to a print shop. An example of this includes printable blank sheets for creating personal business cards.

Printable blank sheets for creating personal business cards usually include multiple business cards on a sheet with perforations surrounding the outline of the cards and running through the entire sheet. The sheet can be passed through a printer and then the sheet can be folded and separated along the perforations to create individual cards. One drawback that exists with the current sheets are that the edges of the separated cards are rough, as the perforations leave a rough and uneven edge on the cards.

SUMMARY

According to the present invention, a printable blank sheet includes a sheet with defined separation lines, a first layer with cuts running through the first layer along the defined separation lines, and a second layer attached to a bottom side of the first layer, with perforations running through the second layer along the defined separation lines.

A method of creating custom print cards includes running a printable blank sheet through a printer to print on defined print areas, wherein the sheet includes slit-over-perforation lines defining a periphery of an object in the sheet, bending the sheet along the slit-over-perforation lines to weaken and separate the slit-over-perforation lines, and detaching the object from the sheet.

DETAILED DESCRIPTION

In general, the present invention relates to printable blank sheets that are capable of being run through a printer or copier. The printable blank sheets include slit-over-perforation lines running through the sheet and defining the shape of objects in the sheet. The objects can be separated from the sheet by breaking the sheet along the slit-over-perforation lines. The slit-over-perforation lines include a cut line through a first layer of the sheet and perforations running through a second layer of the sheet and a coating. The slit-over-perforation lines are advantageous, because they leave a clean edge when objects are separated along the slit-over-perforation lines.

Figure 1:
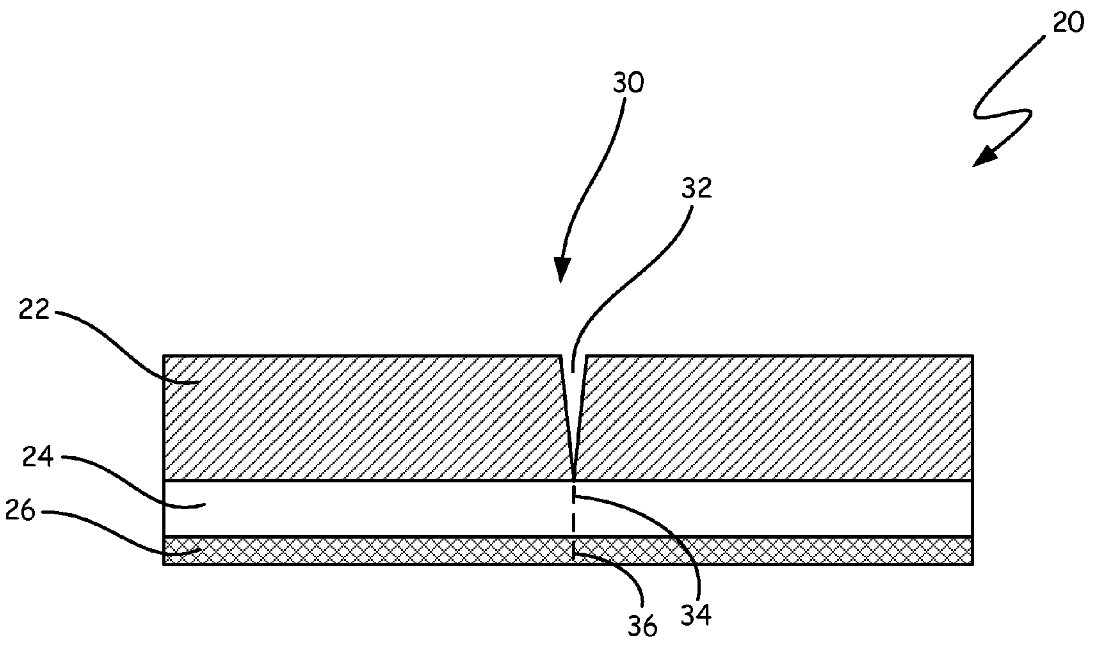
FIG. 1 is a side elevation view of a slit-over-perforation line in a printable blank sheet.

FIG. 1 is a side elevation view of slit-over-perforation line 30 in printable blank sheet 20. Printable blank sheet 20 includes sheet layer 22, laminate layer 24, and coating layer 26. Slit-over-perforation line 30 includes cut 32, perforation 34, and perforation 36. Perforation 34 and perforation 36 are represented by a dashed line in FIG. 1.

Sheet 20 is made out of three layers of materials, including sheet layer 22, laminate layer 24, and coating layer 26. Sheet layer 22 is located on a top side of sheet 20. Laminate layer 24 runs through the middle of sheet 20, with sheet layer 22 on top and coating layer 26 on bottom. Coating layer 26 is located on a bottom side of sheet 20. Sheet layer 22 and laminate layer 24 can be attached with an adhesive, or any other suitable attachment means. Coating layer 26 can be applied to a bottom side of laminate layer 24 through any suitable means. Coating layer 26 can be applied to laminate layer 24 before or after laminate layer 24 is attached to sheet layer 22. Sheet 20 can be any thickness that is capable of being passed through a printer or copier. In alternate embodiments, sheet 20 can include additional layers of materials, such as a coating layer on a top side of sheet layer 22.

Sheet layer 22 can be made out of a normal sheet material that is capable of being printed on. Laminate layer 24 is made out of a laminate material that is capable of providing the strength to keep sheet 20 together as it is passed through a printer or copier. In the embodiment shown, laminate layer 24 is made out of a polyester material. Polyester materials can be used due to their high tensile strength. The tensile strength of laminate layer 24 should be high enough so that sheet 20 can be supported by laminate layer 24 as it is passed through a printer or copier. In the embodiment shown, the tensile strength of the polyester material is between 70 MPa (10,152.64 psi) and 270 MPa (39,160.18 psi). In alternate embodiments, any material having a strength that is capable of supporting sheet 20 can be used. Coating layer 26 can be made out of any material that is capable of being printed on.

Slit-over-perforation line 30 includes cut 32, perforation 34, and perforation 36. Cut 32 runs through sheet layer 22 and extends from a top side of sheet layer 22 to a bottom side of sheet layer 22. Perforation 34 runs through laminate layer 24, as indicated by the dashed line in FIG. 1. Perforation 36 runs through coating layer 26, as indicated by the dashed line in FIG. 1. Cut 32, perforation 34, and perforation 36 are all aligned and run longitudinally across sheet 20. Cut 32 run all the way through sheet layer 22 to separate sheet layer 22 along slit-over-perforation line 30. Perforation 34 and perforation 36 extend through laminate layer 24 and coating layer 26, respectively, and run underneath cut 32 along slit-over-perforation line 30. Slit-over-perforation line 30 thus has a continuous cut through sheet layer 22 with cut 32 and a non-continuous cut through laminate layer 24 and coating layer 26 with perforations 34 and 36.

Slit-over-perforation line 30 is created with a die after sheet 20 is constructed. The die has blades at a primary height and at a secondary height. Blades at the primary height have a height that is equal to the height of cut 32, perforation 34, and perforation 36 altogether. Blades at the secondary height have a height that is equal to the height of cut 34. The blades alternate with a blade at the primary height next to a blade at the secondary height next to a blade at the primary height, and so on. A die with this configuration will cut completely through sheet layer 22 at all locations but will only cut through laminate layer 24 and coating layer 26 at the locations of the blades with the primary height. The blades with the primary height will cut through laminate layer 24 and coating layer 26 in an alternating pattern due to the alternating placement of the blades. This is what creates perforations 34 and perforations 36 in laminate layer 24 and coating layer 26. Overall, a die with blades of alternating heights, such as the one described here, is capable of creating slit-over-perforation lines 30.

To create slit-over-perforations 30 that are capable of breaking apart when bent, laminate layer 24 should have a thickness of about 0.0127 millimeters (0.0005 inches) to 0.102 millimeters (0.004 inches), and perforations 34 and perforations 36 should have a width of about 0.8 millimeters (0.0315 inches) and 2 millimeters (0.0787 inches). In the embodiment shown, laminate layer 24 has a thickness of 0.0254 millimeters (0.001 inches) and perforations 34 and perforations 36 have a width of 1.0 millimeters (0.0394 inches). In alternate embodiments, laminate layer 24 can have any thickness and perforations 34 and perforations 36 can have any width that will allow sheet 20 to break apart along slit-over-perforation 30 when sheet 20 is bent along slit-over-perforation 30.

Slit-over-perforation line 30 runs through sheet 20 to indicate where sheet 20 can be separated. Slit-over-perforation line 30 allows a user to separate sheet 20 easily, as sheet 20 can be bent along slit-over-perforation line 30, causing perforations 34 and 36 to snap apart and separate. Separating sheet 20 along slit-over-perforation line 30 leaves a clean edge where sheet 20 is separated. There will be small microscopic marks from perforations 34 and 36, but the small microscopic marks will be unperceivable when glancing at separated edges of sheet 20.

Slit-over-perforation lines 30 are advantageous, as they allow a user to create their own custom print materials without having to order custom print materials from specialty print shops. Being able to print custom print materials with clean edges allows a user to save money and time by not having to send their orders to print shops, while at the same time maintaining the quality and professionalism of custom print materials with clean edges.

Sheet 20 is also advantageous, as laminate layer 24 is strong enough to support sheet 20 as it is passed through a printer or copier and to prevent sheet 20 from tearing. Laminate layer 24 is constructed out of a material with a high tensile strength so that laminate layer 24 remains intact when sheet 20 is passed through a printer or copier. Perforations 34 run through laminate layer 24 to facilitate the easy separation of laminate layer 24 after sheet 20 has been printed on. The strength of laminate layer 24 is also strong enough to prevent sheet 20 from tearing.

Figure 2A:
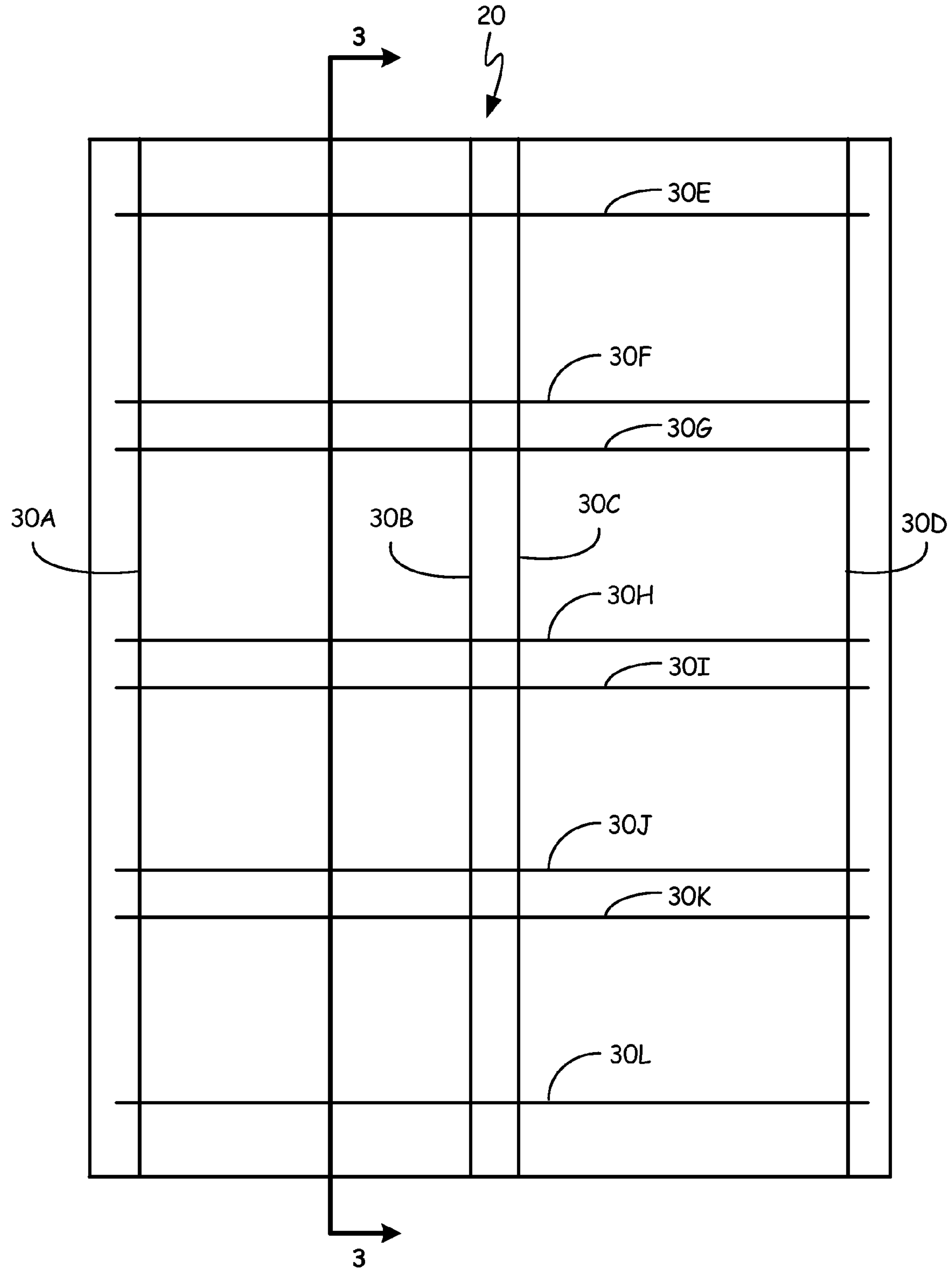
FIG. 2A is a top plan view of the printable blank sheet with slit-over-perforation lines.
Figure 2B:
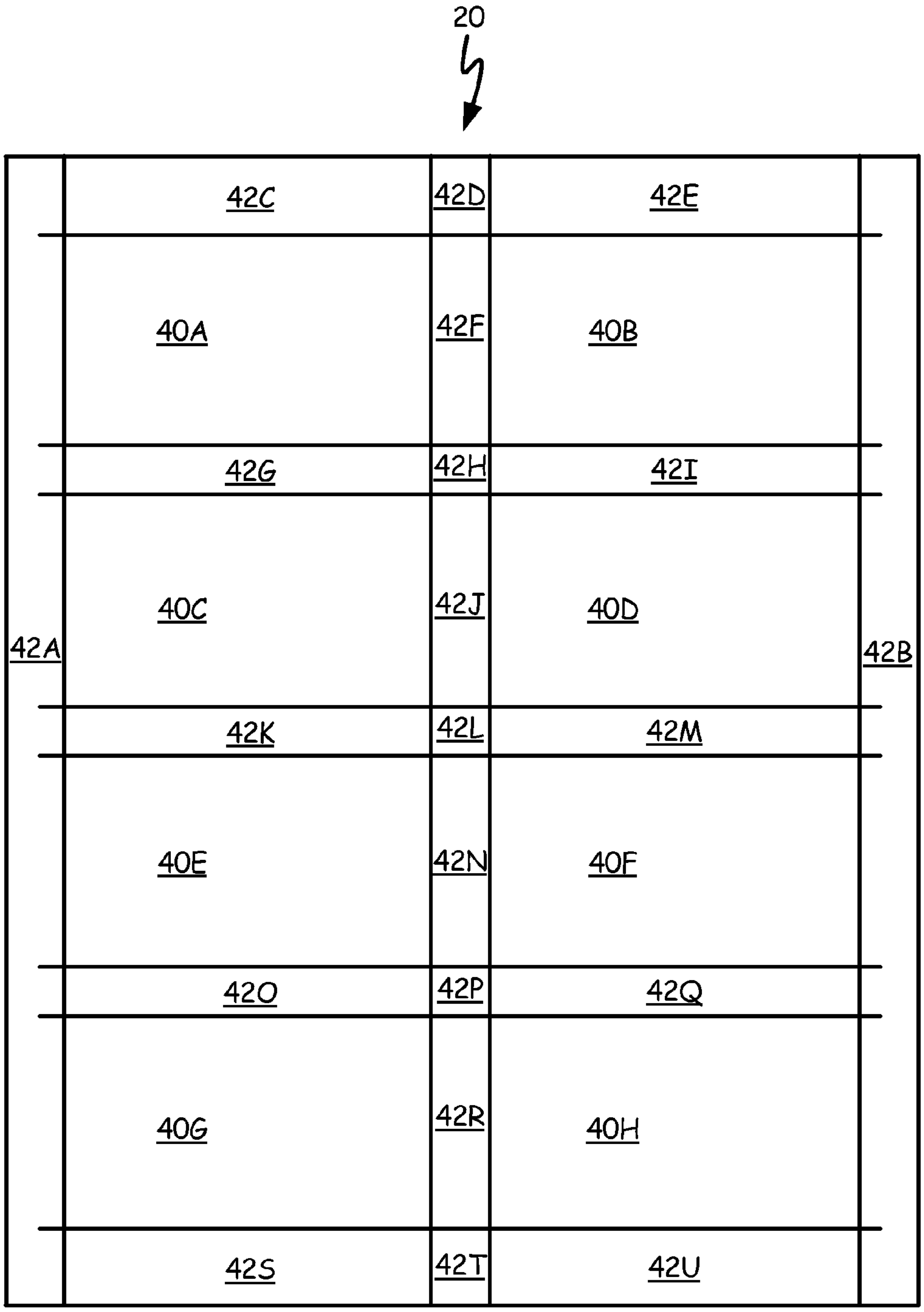
FIG. 2B is a top plan view of the printable blank sheet of FIG. 2A with objects placed on the sheet.

FIG. 2A is a top plan view of printable blank sheet 20 with slit-over-perforation lines 30. FIG. 2B is a top plan view of printable blank sheet 20 with objects 40 placed on sheet 20.

Printable blank sheet 20 includes slit-over-perforation lines 30 (including slit-over-perforation 30A, slit-over-perforation 30B, slit-over-perforation 30C, slit-over-perforation 30D, slit-over-perforation 30E, slit-over-perforation 30F, slit-over-perforation 30G, slit-over-perforation 30H, slit-over-perforation 30I, slit-over-perforation 30J, slit-over-perforation 30K, and slit-over-perforation 30L), objects 40 (including object 40A, object 40B, object 40C, object 40D, object 40E, object 40F, object 40G, and object 40H), and excess sheet areas 42 (including excess sheet area 42A, excess sheet area 42B, excess sheet area 42C, excess sheet area 42D, excess sheet area 42E, excess sheet area 42F, excess sheet area 42G, excess sheet area 42H, excess sheet area 42I, excess sheet area 42J, excess sheet area 42K, excess sheet area 42L, excess sheet area 42M, excess sheet area 42N, excess sheet area 42O, excess sheet area 42P, excess sheet area 42Q, excess sheet area 42R, excess sheet area 42S, excess sheet area 42T, and excess sheet area 42U).

As seen in FIG. 2B, objects 40 are held in sheet 20. There are eight rectangular shaped objects 40 on sheet 20 in the embodiment shown, but in alternate embodiments objects 40 can be any suitable shape and size and there can be any number of objects 40 on sheet 20. Excess sheet areas 42 are also held in sheet 20 and surround objects 40. Excess sheet areas 42 can be discarded when objects 40 are separated from sheet 20. Each object 40 and excess sheet area 42 in sheet 20 is comprised of three layers, including sheet layer 22, laminate layer 24, and coating layer 26 (as seen and described in FIG. 1). An outline of objects 40 and excess sheet areas 42 are shown with defined separation lines.

As seen in FIGS. 2A and 2B, slit-over-perforation lines 30 run through sheet 20 and along the defined separation lines, defining the outline of objects 40 and excess sheet areas 42. Slit-over-perforation lines 30 each include cut 32 through sheet layer 22, perforation 34 through laminate layer 24, and perforation 36 through coating layer 26 (as seen and described in FIG. 1). Cut 32, perforation 34, and perforation 36 are all aligned to form slit-over-perforation lines 30.

A top side of object 40A is attached to excess sheet area 42C along slit-over-perforation line 30E. A left side of object 40A is attached to excess sheet area 42A along slit-over-perforation line 30A. A right side of object 40A is attached to excess sheet area 42F along slit-over-perforation line 30B. A bottom side of object 40A is attached to excess sheet area 42G along slit-over-perforation line 30F.

A top side of object 40B is attached to excess sheet area 42E along slit-over-perforation line 30E. A left side of object 40B is attached to excess sheet area 42F along slit-over-perforation line 30C. A right side of object 40B is attached to excess sheet area 42B along slit-over-perforation line 30D. A bottom side of object 40B is attached to excess sheet area 42I along slit-over-perforation line 30F.

A top side of object 40C is attached to excess sheet area 42G along slit-over-perforation line 30G. A left side of object 40C is attached to excess sheet area 42A along slit-over-perforation line 30A. A right side of object 40C is attached to excess sheet area 42J along slit-over-perforation line 30B. A bottom side of object 40C is attached to excess sheet area 42K along slit-over-perforation line 30H.

A top side of object 40D is attached to excess sheet area 42I along slit-over-perforation line 30G. A left side of object 40D is attached to excess sheet area 42J along slit-over-perforation line 30C. A right side of object 40D is attached to excess sheet area 42B along slit-over-perforation line 30D. A bottom side of object 40D is attached to excess sheet area 42M along slit-over-perforation line 30H.

A top side of object 40E is attached to excess sheet area 42K along slit-over-perforation line 30I. A left side of object 40E is attached to excess sheet area 42A along slit-over-perforation line 30A. A right side of object 40E is attached to excess sheet area 42N along slit-over-perforation line 30B. A bottom side of object 40E is attached to excess sheet area 42O along slit-over-perforation line 30J.

A top side of object 40F is attached to excess sheet area 42M along slit-over-perforation line 30I. A left side of object 40F is attached to excess sheet area 42N along slit-over-perforation line 30C. A right side of object 40F is attached to excess sheet area 42B along slit-over-perforation line 30D. A bottom side of object 40F is attached to excess sheet area 42Q along slit-over-perforation line 30J.

A top side of object 40G is attached to excess sheet area 42O along slit-over-perforation line 30K. A left side of object 40G is attached to excess sheet area 42A along slit-over-perforation line 30A. A right side of object 40G is attached to excess sheet area 42R along slit-over-perforation line 30B. A bottom side of object 40G is attached to excess sheet area 42S along slit-over-perforation line 30L.

A top side of object 40H is attached to excess sheet area 42Q along slit-over-perforation line 30K. A left side of object 40H is attached to excess sheet area 42R along slit-over-perforation line 30C. A right side of object 40H is attached to excess sheet area 42B along slit-over-perforation line 30D. A bottom side of object 40H is attached to excess sheet area 42U along slit-over-perforation line 30L.

To separate objects 40 from sheet 20, sheet 20 can be folded along slit-over-perforation lines 30. Slit-over-perforation lines 30 can then snap apart, leaving a clean edge on the separated portions. Slit-over-perforation lines 30 are advantageous because they allow objects 40 to be easily separated from sheet 20 without leaving uneven edges on the sides of objects 40.

Sheet 20 is also advantageous, as it allows a user to create custom print materials without having to order custom print materials from a specialty print shop. This will save the user time and money. And because slit-over-perforations 30 leave a clean edge when they are separated, the quality and level of professionalism of custom print materials made with slit-over-perforations is similar to the quality and level of professionalism a user can get with specialty print shops. Further, using laminate layer 24 with a high strength is advantageous, as it supports sheet 20 as it is passed through a printer or copier and prevents sheet 20 (and the resulting objects 40) from tearing.

Figure 3:
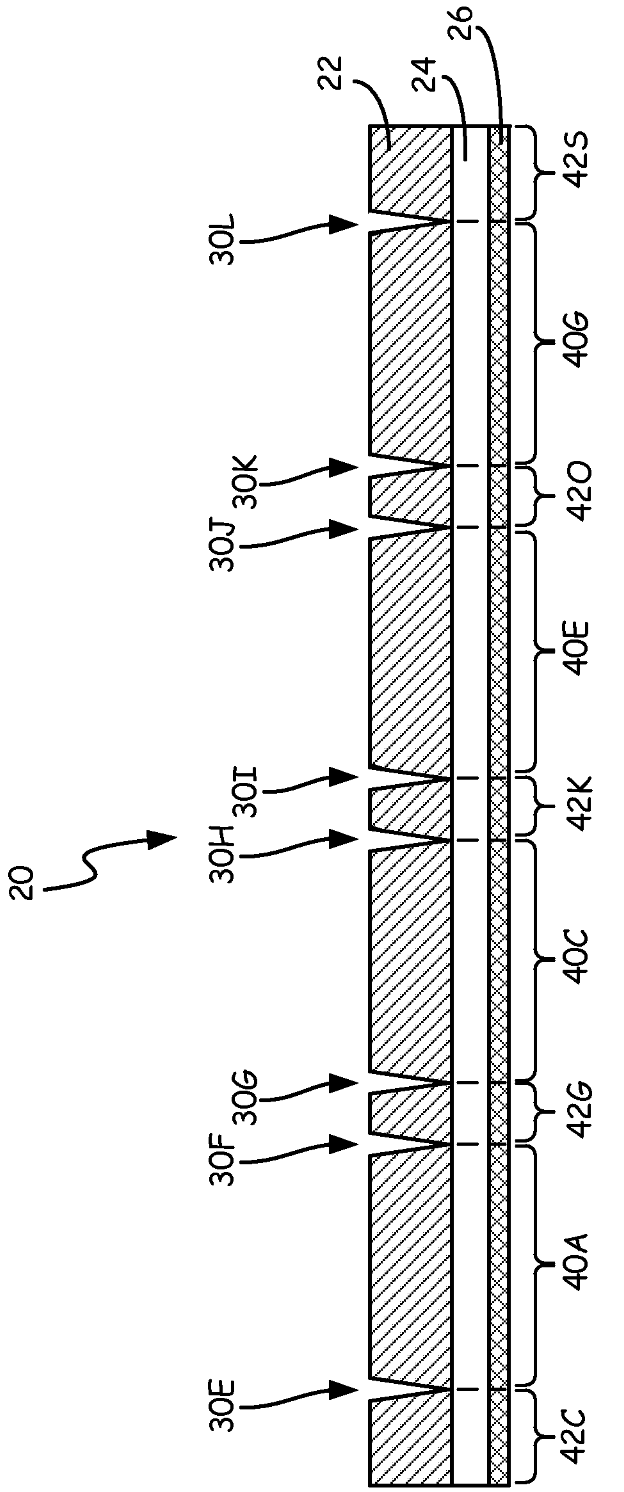
FIG. 3 is a side cross-sectional view of the printable blank sheet of FIG. 2A, taken along line 3-3 of FIG. 2A.

FIG. 3 is a side cross-sectional view of printable blank sheet 20, taken along line 3-3 of FIG. 2A. Printable blank sheet 20 includes sheet layer 22, laminate layer 24, coating layer 26, slit-over-perforation lines 30 (including slit-over-perforation 30E, slit-over-perforation 30F, slit-over-perforation 30G, slit-over-perforation 30H, slit-over-perforation 30I, slit-over-perforation 30J, slit-over-perforation 30K, and slit-over-perforation 30L), objects 40 (including object 40A, object 40C, object 40E, and object 40G), and excess sheet areas 42 (including excess sheet area 42C, excess sheet area 42G, excess sheet area 42K, excess sheet area 42O, and excess sheet area 42S).

Printable blank sheet 20 includes sheet layer 22, laminate layer 24, and coating layer 26. A bottom side of sheet layer 22 is attached to a top side of laminate layer 24, and a bottom side of laminate layer 24 is attached to a top side of coating layer 26. Objects 40 and excess sheet areas 42 are held in sheet 20 and each include sheet layer 22, laminate layer 24, and coating layer 26. Slit-over-perforation lines 30 define the separation lines between excess sheet areas 42 and objects 40. Sheet 20 can be separated along slit-over-perforation lines 30 to facilitate the easy separation of objects 40 from sheet 20.

As you can see in FIG. 3, to separate objects 40 from sheet 20 a user needs to bend sheet 20 along slit-over-perforation lines 30. Bending sheet 20 along slit-over-perforation lines 30 will break apart slit-over-perforation lines 30 and separate objects 40 and excess sheet areas 42 from sheet 20. For example, bending sheet 20 along slit-over-perforation line 30E will separate excess sheet area 42C from object 40A. Bending sheet 20 along slit-over-perforation line 30F will separate object 40A from excess sheet area 42G. This process can continue until all slit-over-perforation lines 30 are separated, including all slit-over-perforation lines 30 as seen in FIG. 2A. Once all slit-over-perforation lines 30 are separated, objects 40 and excess sheet areas 42 should all be separate pieces. Excess sheet areas 42 can be discarded at this point and objects 40 can be used for their intended purpose.

Separating sheet 20 along slit-over-perforation lines 30 is advantageous, as the separations will leave clean edges. Having clean edges is beneficial, as it give the final product a more polished and professional look. Being able to print custom print materials without having to send the materials to a print shop will save time and money for a user. Slit-over-perforations 30 allow the user to print their own custom print materials on sheet 20 that has as high of a quality as something that is sent to a specialty print shop. Further, using laminate layer 24 with a high strength is advantageous, as it supports sheet 20 as it is passed through a printer or copier and prevents sheet 20 (and the resulting objects 40) from tearing.

Figure 4:
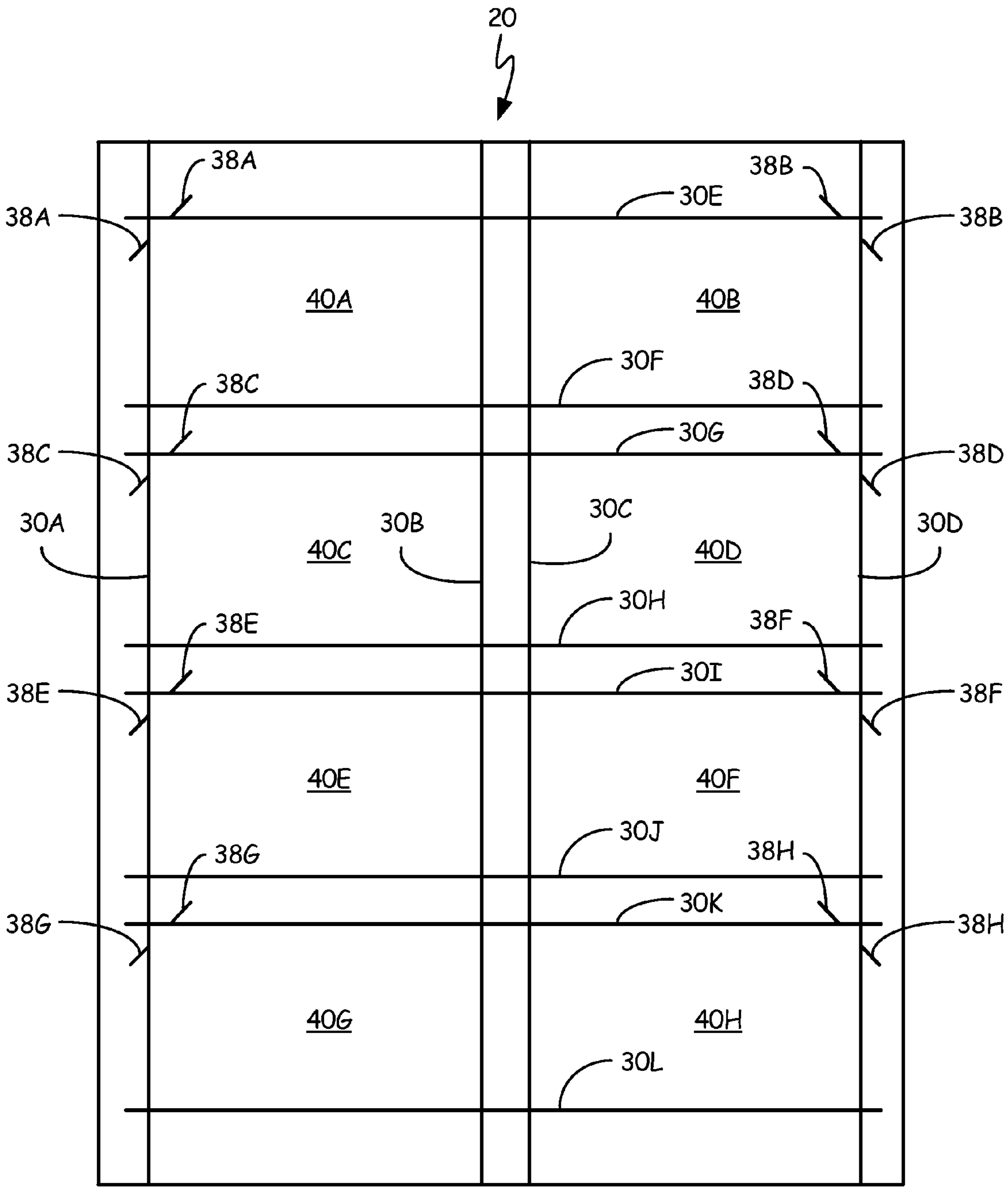
FIG. 4 is a top plan view of the printable blank sheet of FIG. 2A with corner cuts.

FIG. 4 is a top plan view of the printable blank sheet of FIG. 2A with corner cuts 38 added. Printable blank sheet 20 includes slit-over-perforation lines 30 (including slit-over-perforation 30A, slit-over-perforation 30B, slit-over-perforation 30C, slit-over-perforation 30D, slit-over-perforation 30E, slit-over-perforation 30F, slit-over-perforation 30G, slit-over-perforation 30H, slit-over-perforation 30I, slit-over-perforation 30J, slit-over-perforation 30K, and slit-over-perforation 30L), objects 40 (including object 40A, object 40B, object 40C, object 40D, object 40E, object 40F, object 40G, and object 40H), and corner cuts 38 (including corner cuts 38A, corner cuts 38B, corner cuts 38C, corner cuts 38D, corner cuts 38E, corner cuts 38F, corner cuts 38G, and corner cuts 38H).

Slit-over-perforation lines 30 run through sheet 20 and define where sheet 20 can be separated. Slit-over-perforation lines 30 also define the shape of objects 40 in the sheet. Objects 40 can be removed from sheet 20 along slit-over-perforation lines 30. In the embodiment shown, sheet 20 also includes corner cuts 38 that extend a short distance outwards from one corner of each object 40. In alternate embodiments, corner cuts 38 are not present in sheet 20. Corner cuts 38A extend outwards from a corner of object 40A; corner cuts 38B extends outwards from a corner of object 40B; corner cuts 38C extends outwards from a corner of object 40C; corner cuts 38D extends outwards from a corner of object 40D; corner cuts 38E extends outwards from a corner of object 40E; corner cuts 38F extends outwards from a corner of object 40F; corner cuts 38G extends outwards from a corner of object 40G; and corner cuts 38H extends outwards from a corner of object 40H.

Corner cuts 38 cut completely through sheet 20 (including sheet layer 22, laminate layer 24, and coating layer 26) and facilitate the easy removal of objects 40 from sheet 20. As a user bends sheet 20 along slit-over-perforation lines 30, they can use corner cuts 38 to facilitate the removal of objects 40 from sheet 20. This is advantageous, as it allows a user to easily remove object 40 with minimal effort.

Figure 5:
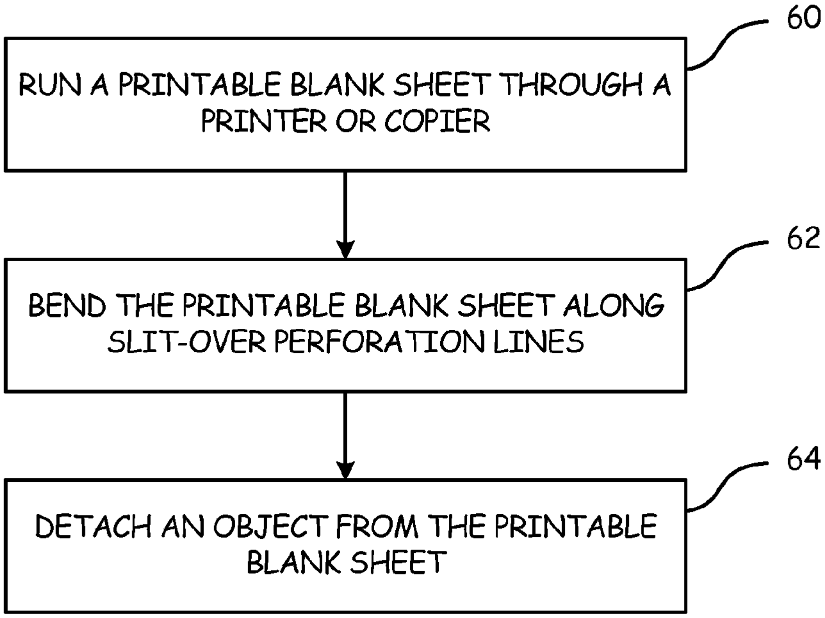
FIG. 5 is a flow chart that shows how an object can be separated from a printable blank sheet with slit-over-perforation lines.

FIG. 5 is a flow chart that shows how object 40 can be separated from printable blank sheet 20 with slit-over-perforation lines 30. Step 60, step 62, and step 64 show how object 40 can be separated from printable blank sheet 20.

Step 60 includes running printable blank sheet 20 through a printer or copier. Sheet 20 will be supplied to a user from a manufacturer and will contain slit-over-perforation lines 30 when it is given to the user. Slit-over-perforation lines 30 will define the outline of objects 40 in sheet 20 and will indicate defined separation lines. Sheet 20 includes sheet layer 22, laminate layer 24, and coating layer 26. Both sheet layer 22 and coating layer 26 are capable of being printed on, thus sheet 20 can be printed on both sides. Prior to printing on sheet 20, a template on a computer can be used to create the custom image that is to be printed on sheet 20, and specifically objects 40.

Step 62 includes bending printable blank sheet 20 along slit-over-perforation lines 30. Slit-over-perforation lines 30 define the periphery of objects 40 in sheet 20. To separate sheet 20 along slit-over-perforation lines 30, the user can bend sheet 20 along slit-over-perforation lines 30. As sheet 20 is bent along slit-over-perforation lines 30, slit-over-perforation lines 30 will snap apart. When slit-over-perforation lines 30 are snapped apart, they will leave a clean-edge on the portion of sheet 20 that has been separated.

Step 64 includes detaching objects 40 from printable blank sheet 20. To separate objects 40 from sheet 20, the user can bend sheet 20 along each slit-over-perforation line 30 to break them apart. This will detach objects 40 and excess sheet areas 42 from sheet 20. Each side of objects 40 can be detached separated from sheet 20 along a slit-over-perforation line 30. After objects 40 are separated from sheet 20, excess sheet areas 42 can be discarded.

The method seen in steps 60-64 are advantageous, as they allows a user to easily separate objects 40 from sheet 20. Minimal effort needs to be expended on the behalf of the user, as slit-over-perforation lines 30 will easily snap apart when they are folded. Further, separating objects 40 from sheet 20 along slit-over-perforation lines 30 will leave objects 40 with clean edges. Having clean edges is advantageous, as it presents a more polished and professional look. This method is also advantageous, as it allows a user to print their own custom print materials, which saves time and money.

Figure 6A:
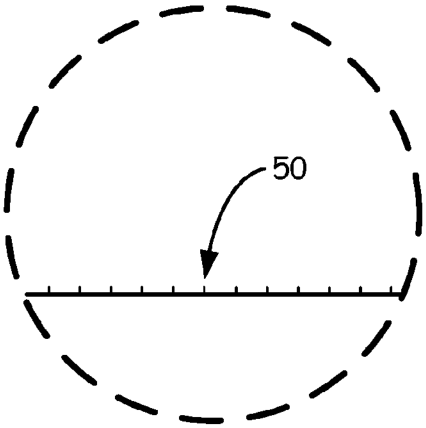
FIG. 6A is an enlarged view of an edge of the object of FIG. 6.
Figure 6:
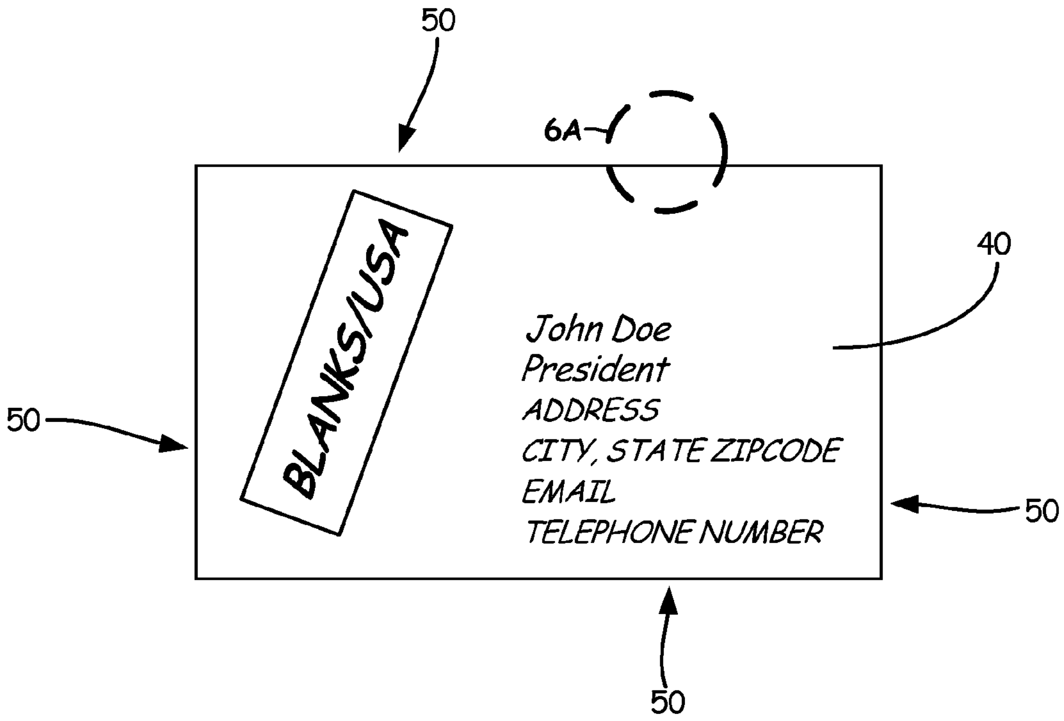
FIG. 6 is a top plan view of an object that has been separated from a printable blank sheet with slit-over-perforation lines.

FIG. 6 is a top plan view of object 40 that has been separated from printable blank sheet 20 with slit-over-perforation lines 30. Object 40 includes clean edges 50.

Clean edges 50 result when object 40 is separated from sheet 20 along slit-over-perforation lines 30. As seen in FIG. 6A, clean edges 50 have small imperfections that are visible when clean edge 50 is enlarged, but these small imperfections are not visible when looking at object 40 with a normal viewpoint. The small imperfections typically go unnoticed by the normal user.

As seen from this, slit-over-perforation lines 30 leave objects 40 with clean edges 50. Clean edges 50 are advantageous, as they have a more polished and professional look. Being able to create custom print materials with clean edges 50 is advantageous, as a user can create high quality and professional looking custom print materials without having to send an order for materials to a print shop, which can be costly and time consuming.

While the invention has been described with reference to objects 40 with a specific shape and size, any object can be placed on printable blank sheet 20. Examples can include business cards, postcards, calendars, or door hangers. Sheet 20 was described with reference to particular materials, shape and size, but sheet 20 can be made of any materials that are capable of being printed on and can be any size and shape that is capable of being run through a printer or copier.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A printable blank sheet comprising:

a sheet with a first layer and a second layer attached to a bottom side of the first layer, wherein the sheet is configured to be run through a printer;

slit-over-perforation lines defining a periphery of an object in the sheet and an excess sheet area surrounding the object, wherein the slit-over-perforation lines comprise:

cuts running through the first layer; and perforations running through the second layer; and a corner cut running through the first layer and the second layer, wherein the corner cut extends from one of the slit-over-perforation lines into the excess sheet area.

2. The printable blank sheet of claim 1, wherein the first layer is a sheet material that is capable of being printed on.

3. The printable blank sheet of claim 1, wherein the second layer is a laminate material.

4. The printable blank sheet of claim 3, wherein the laminate material is a polyester material.

5. The printable blank sheet of claim 3, wherein the laminate material has an ultimate tensile strength between 70 MPa (10,152.64 psi) and 270 MPa (39,160.18 psi).

6. The printable blank sheet of claim 1, and further comprising:

a third layer attached to a bottom side of the second laminate layer;

wherein the slit-over-perforation lines further comprise perforations running through the third layer along the slit-over-perforation lines; and wherein the corner cuts run through the third layer.

7. The printable blank sheet of claim 6, wherein the third layer is a coating that is capable of being printed on.

8. The printable blank sheet of claim 1, wherein the sheet is any size that is capable of being passed through a printer.

9. A printable blank sheet comprising:

a sheet with a first layer attached to a top side of a laminate layer, and a coating layer attached to a bottom side of the laminate layer, wherein the sheet is configured to be run through a printer; and slit-over-perforation lines defining the peripheries of objects in the sheet and an excess sheet area surrounding the objects, wherein the slit-over-perforation lines comprise:

cut lines running through the first layer along the slit-over-perforation lines;

perforations running through the laminate layer along the slit-over-perforation lines; and perforations running through the coating layer along the slit-over-perforation lines; and a corner cut running through the first layer, the laminate layer, and the coating layer, wherein the corner cut extends from one of the slit-over-perforation lines into the excess sheet area;

wherein a top side of the first layer can be printed on and a bottom side of the coating can be printed on.

10. The sheet of claim 9, wherein the laminate layer is a polymer material with an ultimate tensile strength between 70 MPa (10,152.64 psi) and 270 MPa (39,160.18 psi).

11. The sheet of claim 9, wherein the perforations running through the laminate layer and coating layer have a width between 0.8 millimeters (0.0315 inches) and 2 millimeters (0.0787 inches).

12. The sheet of claim 9, wherein the objects are capable of being separated from the sheet.

13. The sheet of claim 12, wherein the objects can be separated from the sheet by bending and separating the sheet along the slit-over-perforation lines.

14. A method for creating custom print cards, the method comprising:

running the printable blank sheet of claim 1 through a printer to print on defined print areas, wherein the sheet includes slit-over-perforation lines defining a periphery of an object in the sheet;

bending the sheet along the slit-over-perforation lines to weaken and separate the slit-over-perforation lines; and detaching the object from the sheet.

15. The method of claim 14, wherein the sheet includes a first sheet layer, a second laminate layer, and a third coating layer.

16. The method of claim 15, wherein the slit-over-perforation lines include cut lines running through the first sheet layer, and perforations running through the second laminate layer and the third coating layer.

17. The method of claim 16, wherein the cut lines and perforations are all aligned.

18. The method of claim 15, wherein the second laminate layer is a laminate with an ultimate tensile strength between 70 MPa (10,152.64 psi) and 270 MPa (39,160.18 psi).

19. The method of claim 14, wherein the sheet is capable of containing more than one object.

* * * * *